March 30, 1948.     E. W. SMITH     2,438,522
GEOMETRICAL COMPUTING DEVICE
Filed June 18, 1943
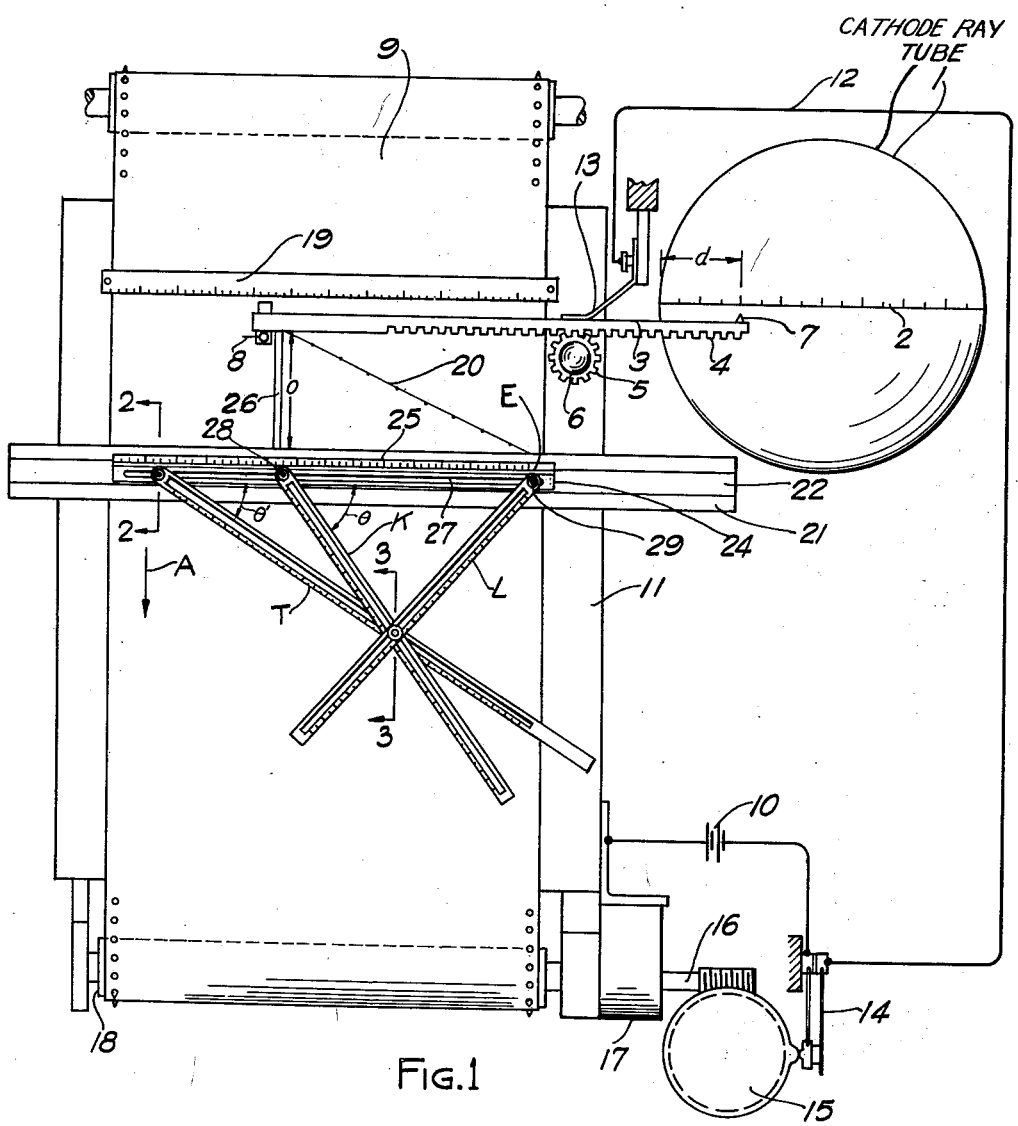
INVENTOR.
Edward W Smith
BY
HIS ATTORNEY.

Patented Mar. 30, 1948

2,438,522

UNITED STATES PATENT OFFICE 2,438,522

GEOMETRICAL COMPUTING DEVICE

Edward W. Smith, Melrose, Mass., assignor, by mesne assignments, to Submarine Signal Company, Boston, Mass., a corporation of Delaware Application June 18, 1943, Serial No. 491,419

1 Claim. (Cl. 235—61.5)

The present invention relates to a computing and plotting device which may be used in connection with ranging equipment for the purpose of computing the courses of a vessel and more particularly for establishing the proper course for directing a torpedo in a torpedo attack against another vessel.

The present arrangement preferably employs a range indicator which may be of the so-called radar type in which ultra-high electromagnetic waves are employed or of the type in which high frequency sound waves are employed in submarines or air signaling systems.

The invention is more particularly adaptable for military purposes and finds its greatest use in rapidly computing and establishing the proper course which a torpedo being sent out from the attacking vessel must take in order to strike its target. At times of such an attack the determination of the torpedo course should be done quickly and accurately and proper computing equipment which will aid the personnel of the vessel is highly desirable and useful for efficient operation and manoeuvers. In the present system the attacking vessel is manoeuvered to establish a collision course with the target or substantially a collision course under which conditions the rate of approach of the attacking vessel and the target is substantially constant. This rate of approach is the relative speed of the target and the attacking vessel. With this value established and with the velocity and direction of the attacking vessel known, the course of the target is established and thereby also the course for the torpedo sent out from the attacking vessel.

The invention will be more fully described in connection with the embodiment described in the specification below when taken in connection with the drawing in which Figure 1 shows partly schematically the arrangement of the present invention, Figure 2 shows a detail section on the line 2—2 of Figure 1 and Figure 3 shows a detail section on the line 3—3 of Figure 1.

In the drawing, 1 represents a cathode ray tube which may be an indicator for radar apparatus or a distance measuring element for submarine sound device in which the distance $d$ from the left as read on the scale 2 indicates the distance of the target. A marking rod 3 which is provided with a rack 4 may be moved by a gear 5 turned manually by the knob 6 to bring the pointer 7 at the end of the rod or bar 3 to the point at which the distance indication is received. At the other end of the rod 3 there is provided a marking stylus 8 which moves over a recording sheet 9 as the rod 3 is adjusted to the distance indicated on the indicator 1. The stylus 8 is in the electrical circuit of the battery 10 one side of which is connected to a conducting plate 11 over which the recording paper 9 moves in contact with the plate while the other end of the battery 10 is connected by the conductor 12 to which is connected to the contact spring 13 which bears against the bar 3 by means of which the stylus 8 is electrically energized. The paper 9 may be of any conventional type of marking recording paper in which a current passing through it from the stylus leaves a black mark on the paper.

In the circuit of the battery 10 between the battery and the line 12 is a contact switch 14 which is periodically energized by the cam 15 rotated by means of a gear-reduction unit 16 which is driven by the motor 17 which also drives the feeding roll 18 which feeds the recording paper 9. The motor 17 rotates at a constant velocity so that the paper 9 is fed at a constant velocity over the plate 11. The switch 14 is closed periodically frequently so that a number of records of distance may be made on the recording paper 9 for each setting of the bar 3. The indications made by the stylus 8 on the recording paper 9 will record distance as measured by the scale 19 from the left end of the scale. This may be calibrated in the same unit as the distance indication 1 or different units, if desired.

If a collision course has been set by the attacking vessel on the target, then with a constant travel of the recording paper 9 the points recorded by the stylus 8 will fall on a straight line as represented by the straight line 20 on the paper. Over the marking paper at a point later in the movement of the paper as indicated by the direction of the arrow A, there may be fixed a bar or plate 21 having a groove 22 in which a rule 24 carrying the marking scale 25 may be moved transversely across the direction of motion of the paper. This scale 25 is a calibration of speeds, and, by properly positioning it, the intersection of the line 20 and the scale 25 will mark the relative speed of the attacking vessel and the target. This is preferably accomplished as shown in the figure with the end E of the scale 25 representing the beginning of the scale. This end is set to intersect the line 20, at the point E. The slope of the line 20 will mark the relative velocities of the target and the attacking ship and if a constant value is always chosen for the third side of the right triangle made up by the line 20 and the rule 25, as, for instance, the line O, then the measurement on the rule 25 from the intersection of the line 20 with it to the line O which marks a fixed distance for all measurement will be the relative velocity. The distance O may be fixed as the distance between the bar 3 and the rule 25 and, if desired, a vertical sliding member 26 may be applied to the bar or plate 21 so that the intersection of the line 20 with the bar 3 may be carried down to the rule 25. When this point has been determined, the pivoted rule K representing the ship's course may be slid along the slot 27 in the bar 24 and the pivoted end 28 locked at this point. The rule K is also calibrated in velocity and a velocity corresponding to the velocity of the ship is set off in the direction of the angle $\theta$ corresponding to the bearing of the target ship from the attacking ship with reference to the course of the attacking ship, and the bar L which has a fixed pivot in the bar 24 at the point 29 is swung to the point on the bar K corresponding to the attacking ship's speed. The rule or bar L may also be calibrated in velocities, if desired, and therefore the length of the bar or rule L from the point 29 to the intersection of the rule K will give the velocity of the target and also its relative direction.

In Figure 2, it will be noted that the rule T is provided with a stud 50 with a flange 51 which rests against a shoulder 52 recessed in the underside of the bar 24 and that the stud 50 is threaded to receive the lock nut 53 to clamp the rule T in place after it has been properly positioned.

In Figure 3 it will be noted that all three rules T, K and L may be clamped in place by the clamping stud 54 and nut 55. The nut 55 may be provided with a perforation 56 so that a marker or pencil may be inserted in the perforation to mark the intersection of the three rules. The clamping elements may however be omitted in which case each of the three rules may be independently placed.

It is now only necessary to determine the direction at which the torpedo is to be fired in order that it also may affect a collision course. For this purpose the arm K must be lengthened from the point of intersection between the rules K and L to the rule 25 such that the new length will correspond to the torpedo speed. The rule K may be used for this purpose but if desired a second rule T may be employed which also has speed calibrations and this may be set at such a length that the space between the intersection of the rules K, L and T and the rules 25 and T are such that the length T between these intersections corresponds to the torpedo speed. The angle $\theta'$ between the rule 25 and the rule T represents the proper torpedo angle. The angle $\theta$ between the rule 25 and the rule K represents the ship's angle for a collision course.

It is interesting to note that as long as the courses and velocities of the attacking and target ships remain the same, the instant of firing is of no importance since the torpedo will strike the target when fired from any point on the course of the attacking ship provided that the course of the torpedo with respect to the course of the ship is the angle $\theta'$.

Having now described my invention, I claim:

A device for determining from an attacking vessel the necessary course of a torpedo for the latter's collision with a target vessel comprising the combination of a record chart having an axis, means operable to produce thereon a series of marks defining a line which when attacking and target vessels are on collision courses at constant speeds is a straight line making an angle with said chart axis such that said angle is a measure of the rate of change of distance of the target vessel from the attacking vessel and a portion of said line represents the hypotenuse of a right triangle whose altitude is a predetermined length of said chart axis and whose base is a measure of the speed of the target vessel relative to the attacking vessel, scale means calibrated in units of speed, adjustable mounting means for mounting said scale means over said chart in a position to coincide with the base of said triangle, a plurality of scale-carrying arms calibrated in similar units of speed and adapted to represent velocity vectors and means pivoting the same to said first scale means at adjustable points along its length for establishing vector triangles representing the relative speeds and courses of the attacking vessel, the target vessel and the torpedo.

EDWARD W. SMITH.

REFERENCES CITED

The following references are of record in the file of this patent:

UNITED STATES PATENTS

| Number | Name | Date |
|---|---|---|
| 1,782,294 | Florisson | Nov. 18, 1930 |
| 2,071,425 | Papello | Feb. 23, 1937 |
| 1,466,416 | Whitaker | Aug. 28, 1923 |
| 1,661,095 | Rowe | Feb. 28, 1928 |

FOREIGN PATENTS

| Number | Country | Date |
|---|---|---|
| 587,185 | France | Apr. 14, 1925 |
| 291,023 | Great Britain | Nov. 22, 1928 |
| 23,872 | Great Britain | 1904 |
| 5,031 | Great Britain 1909 | Nov. 6, 1913 |